United States Patent
Kisel et al.

(10) Patent No.: US 9,325,527 B2
(45) Date of Patent: Apr. 26, 2016

(54) OPTIMISED BANDWIDTH UTILISATION IN NETWORKS

(75) Inventors: Andrey Kisel, Maidenhead (GB); Dave Cecil Robinson, Aldbourne (GB)

(73) Assignee: Alcatel Lucent, Boulogne-Billancourt (FR)

( * ) Notice: Subject to any disclaimer, the term of this patent is extended or adjusted under 35 U.S.C. 154(b) by 1289 days.

(21) Appl. No.: 13/143,265

(22) PCT Filed: Dec. 31, 2009

(86) PCT No.: PCT/EP2009/009354
§ 371 (c)(1),
(2), (4) Date: Sep. 26, 2011

(87) PCT Pub. No.: WO2010/078958
PCT Pub. Date: Jul. 15, 2010

(65) Prior Publication Data
US 2012/0016993 A1    Jan. 19, 2012

(30) Foreign Application Priority Data
Jan. 6, 2009  (EP) ................................. 09290002

(51) Int. Cl.
*G06F 15/173*  (2006.01)
*H04L 12/54*  (2013.01)
(Continued)

(52) U.S. Cl.
CPC ............ *H04L 12/5695* (2013.01); *H04L 47/10* (2013.01); *H04L 47/18* (2013.01); *H04L 47/25* (2013.01); *H04L 47/263* (2013.01);
(Continued)

(58) Field of Classification Search
CPC .............................. H04L 67/32; H04L 67/322
USPC ....................................................... 709/203, 226
See application file for complete search history.

(56) References Cited

U.S. PATENT DOCUMENTS 5,918,002 A * 6/1999 Klemets ................ H04L 1/1838
                                                              455/7
6,526,022 B1 * 2/2003 Chiu ...................... H04L 1/0002
                                                              370/229
(Continued)

FOREIGN PATENT DOCUMENTS

CN         101035139 A        9/2007
GB         2 417 390 A        2/2006

OTHER PUBLICATIONS

Tong Shan et al., Bandwidth Management for Supporting Differentiated-Service-Aware Traffic Engineering, IEEE Transactions on Parallel and Distributed Systems, vol. 18, No. 9, XP011190143, pp. 1320-1331, Sep. 1, 2007.

(Continued)

*Primary Examiner* — Duyen Doan
(74) *Attorney, Agent, or Firm* — Fay Sharpe LLP

(57) ABSTRACT

A multimedia delivery network, comprising network resource allocation means for allocating bandwidth to a network session between a UE (user equipment) device on the network and a delivery server, wherein the allocation means is adapted to reserve a nominal bandwidth for the network session when the session is opened, which permits delivery of data from the delivery server to the UE at a nominal service rate, and wherein the delivery server is adapted to increase the bandwidth of the session, to a higher bandwidth once the session has been opened, so as to permit delivery of data from the delivery server to the UE at a burst delivery rate higher than the nominal rate.

18 Claims, 3 Drawing Sheets

(51) Int. Cl.
  *H04L 12/801* (2013.01)
  *H04L 12/825* (2013.01)
  *H04L 12/911* (2013.01)
  *H04L 12/919* (2013.01)
  *H04L 29/06* (2006.01)

(52) U.S. Cl.
  CPC .............. *H04L 47/72* (2013.01); *H04L 47/765* (2013.01); *H04L 47/822* (2013.01); *H04L 65/4092* (2013.01); *H04L 65/608* (2013.01); *H04L 65/80* (2013.01); *Y02B 60/31* (2013.01)

(56) References Cited

U.S. PATENT DOCUMENTS

| | | | | |
|---|---|---|---|---|
| 6,683,853 | B1* | 1/2004 | Carlsson | H04L 12/5695 370/230 |
| 8,046,483 | B2* | 10/2011 | Park | H04N 5/76 455/414.1 |
| 8,612,609 | B2* | 12/2013 | Mang et al. | 709/228 |
| 2005/0259583 | A1* | 11/2005 | Froc | H04L 1/0006 370/235 |
| 2006/0120282 | A1* | 6/2006 | Carlson | H04L 12/2602 370/229 |
| 2008/0123661 | A1* | 5/2008 | Steets | H04L 12/5695 370/395.21 |
| 2008/0140853 | A1 | 6/2008 | Harrison | |
| 2008/0175255 | A1* | 7/2008 | Krstulich | H04L 41/5029 370/401 |
| 2009/0178058 | A1* | 7/2009 | Stillwell, III | H04L 67/322 719/317 |

OTHER PUBLICATIONS

Yuen J. et al., "A Fair and Adaptive Scheduling Protocol for Video Stream Transmission in Mobile Environment," Multimedia and Expo, 2002 IEEE International Conference on Lausanne, XP010604392, pp. 409-412, Aug. 26, 2002.

Hongli Luo et al., "Video Streaming Over the Internet with Optimal Bandwidth Resource Allocation," Multimedia Tools and Applications, Kluwer Academic Publishers, vol. 40, No. 1, XP019612000, pp. 111-134, Jan. 25, 2008.

Ronald Bollow, et al., "Video Transmission using the available bit rate service," The University of Berlin, Jan. 14, 1997, Berlin, Germany, 48 pages.

Bing Zheng, et al., "Video on demand over ATM: System Design and Networking Requirements," TheUniversity of Dayton, Dayton, Ohio, Jun. 7, 1998, 9 pages.

* cited by examiner

OPTIMISED BANDWIDTH UTILISATION IN NETWORKS

BACKGROUND OF THE INVENTION

This invention relates to the optimisation of bandwidth utilisation in delivery networks. In particular, it relates to a multimedia delivery network in which the network resources reserved for a network session may be varied in accordance with available network resources. The invention may be applicable to on-demand multimedia delivery, gaming, content sharing or other services requiring Quality of Service (QoS).

DESCRIPTION OF THE PRIOR ART

In order to provide competitive service quality, to retain existing customers and to appeal to new customers, IPTV (Internet Protocol TV) and increasingly OTT (over the top) service providers rely on the QoS (quality of service), provided by delivery networks, to deliver multimedia content and services. Examples of such services include IPTV video on demand, video from Internet video-sharing sites, and broadcast TV, all of which may be delivered over Internet Protocol (IP) networks. The quality of service (QoS) is required to ensure that the multimedia content is delivered with good timing and is not corrupted whilst the user is watching it. In order to achieve QoS, network elements can reserve necessary resources (e.g. network bandwidth), dedicating the reserved resources to delivering the multimedia content.

Considering, for example, IPTV solutions, these generally guarantee QoS by integrating multimedia delivery with network resource control sub-systems and deliver multimedia at a steady encoded bit-rate.

A resource release flow using this approach is illustrated schematically in FIG. 6. This shows three components, a Resource and Administration Control Server (RACS) 20, User Equipment (UE) 10 (eg customer's set-top box) and a Content on Demand (CoD) Server 30. A TCP connection is made for a Real Time Streaming Protocol (RTSP) session. The content is then streamed from the CoD MF (Media Function) 30 to the UE, at fixed rate. Upon completion of streaming, an RTSP TEARDOWN message (as defined in RFC 2326) is sent, the content stream is terminated and the CoD MF 30 sends a request to the RACS 20 to release the allocated network resources. A message is then sent to the UE that the session is completed.

However, this flow requires network resources to be reserved at a nominal service bit-rate (eg a multimedia encoded bit-rate of the multimedia content) for the whole duration of the service session, which means that service sessions and network QoS sessions are effectively coupled and have the same duration.

For example, in the case of an IPTV CoD (content on demand) service network bandwidth (BW) is reserved at the multimedia encoded bit-rate for the whole duration of the service session, as illustrated in FIG. 6.

This reserved network bandwidth (BW) is often unused for periods during the service session (for example during pause—the user may wish to pause for his convenience at any time). Accordingly, in known delivery networks, resource reservations are held longer then required and the effective network capacity is reduced. Moreover, networks may have additional resources which are unreserved for short periods of time, eg during periods of low network demand. These resources are effectively unused if the content of network sessions is delivered only at the encoded bit-rate.

BRIEF SUMMARY OF THE INVENTION

The present invention arose in an attempt to provide an improved delivery network.

According to the present invention in a first aspect there is provided a multimedia delivery network, comprising network resource allocation means for allocating bandwidth to a network session between a UE (user equipment) device on the network and a delivery server, wherein the allocation means is adapted to reserve a nominal bandwidth for the network session when the session is opened, which permits delivery of data from the delivery server to the UE at a nominal service rate, and wherein the delivery server is adapted to increase the bandwidth of the session to a higher bandwidth once the session has been opened, so as to permit delivery of data from the delivery server to the UE at a burst delivery rate higher than the nominal rate.

This enables network capacity to be increased and more effectively used. Since content can be delivered faster than with previously proposed schemes, it also enables resources to be released earlier.

The maximum bandwidth at which data is delivered may be dependent upon available network bandwidth.

Preferably, the UE is provided with local data storage means for storing data received from the delivery server. The UE may be IPTV, Internet TV, cable or other equipment.

Thus, even if playback of content is paused by the user, content delivery continues and is locally cached until required.

The delivery server is preferably adapted to dynamically vary the bandwidth allocated to the network session above the nominal bandwidth, depending on the available network bandwidth, so as to provide a burst delivery rate that varies depending upon the available network bandwidth at any time during the network session.

The delivery server may be adapted to increase the bandwidth to the maximum bandwidth available, so as to provide a burst delivery rate which is as high as the network will permit.

The UE may be adapted to provide feedback to the delivery server. The UE may be adapted to detect missing data and to request missing packets from the delivery server or network using a retransmission approach and an RTP/RTCP (real time protocol/real time control protocol) feedback mechanism. The retransmission may use a Retransmission (Retr) server which caches content so that upon request one or more packets or portions of content (eg video frames) may be retransmitted if the UE finds that the ones originally transmitted are corrupted or incomplete.

The delivery server may be adapted to increase the bandwidth gradually.

The delivery server may be adapted to increase the bandwidth gradually, waiting for the results of feedback received by the delivery service, so as to limit the burst delivery rate to a speed appropriate to the connection between the delivery server and the UE.

The delivery server may be adapted to increase the bandwidth gradually until a retransmission request is received, and, once the retransmission request has been received, to reduce the bandwidth gradually until retransmission requests are no longer received. The delivery server may be adapted to cyclically increase and decrease the bandwidth, in accordance with the retransmission requests.

According to the present invention in a further aspect, there is provided a content delivery method over a network, comprising modifying the network bandwidth allocated to a network session between a UE (user equipment) device on the network and a delivery server, wherein a nominal bandwidth for the network session is reserved when the session is opened, which permits delivery of data from the delivery server to the UE at a nominal service rate, and the bandwidth of the session is increased to a higher bandwidth once the session has been opened, so as to permit delivery of data from the delivery server to the UE at a burst delivery rate higher than the nominal rate.

The content will generally be multimedia content, but may be other types of content.

The delivery server may dynamically vary the bandwidth allocated to the network session above the nominal bandwidth, depending on the available network bandwidth, so as to provide a burst delivery rate that varies depending upon the available network bandwidth at any time during the network session.

The delivery server may increase the bandwidth to the maximum bandwidth available, so as to provide a burst delivery rate which is as high as the network will permit. Alternatively, the delivery server may increase the bandwidth gradually.

The UE may provide feedback to the delivery server. The delivery server may increase the bandwidth gradually, waiting for the results of the feedback received by the delivery server, so as to limit the burst delivery rate to a speed appropriate to the connection between the delivery server and the UE.

The UE may request, from the delivery server or network, any missing packets using a retransmission approach and a RTP/RTCP feedback mechanism.

The delivery server may increase the bandwidth gradually until a retransmission request is received, and, once the retransmission request has been received, reduce the bandwidth gradually until retransmission requests are no longer received.

Thus, if the speed of the burst delivery is found to be too fast for reliable delivery, it can be throttled back or reduced to the fastest speed which still provides reliable delivery.

The delivery server may cyclically increase and decrease the bandwidth, in accordance with the retransmission requests.

The invention also provides a network or method including any one or more of the novel features, combinations of features, steps or combination of steps disclosed herein.

DESCRIPTION OF THE DRAWINGS

Embodiments of the invention will now be described, by way of example only, with reference to the accompanying schematic drawings in which.

DETAILED DESCRIPTION OF EMBODIMENTS OF THE INVENTION

Figure 1:
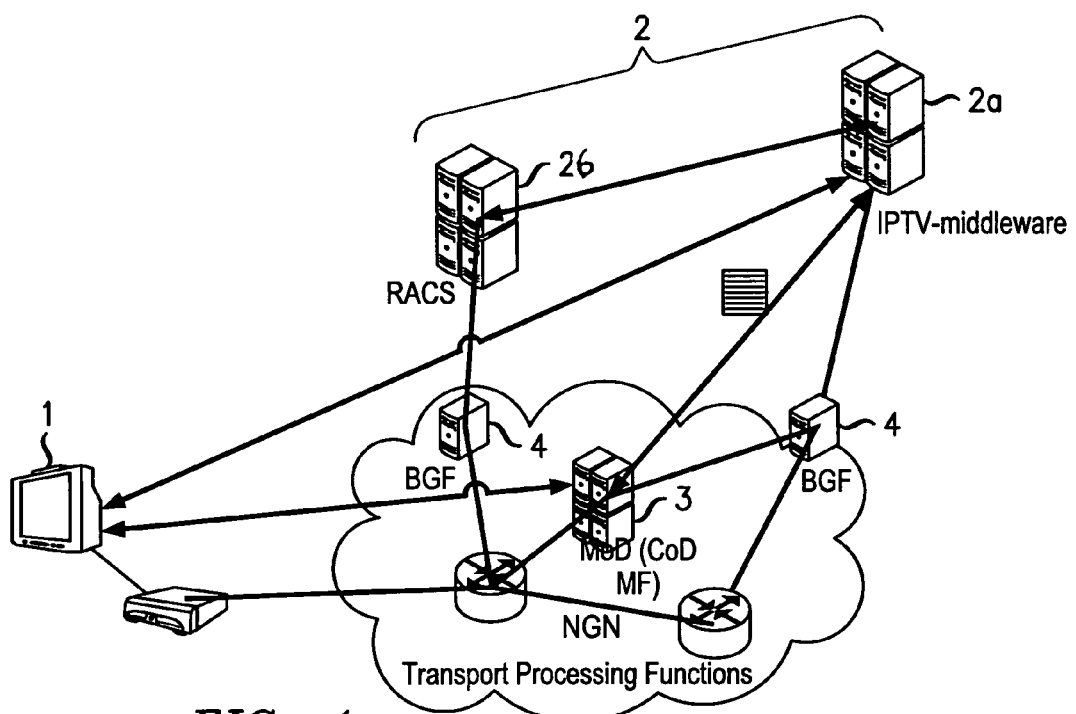
FIG. 1 shows schematically a network according to the present invention.

Referring to FIG. 1, there is shown a network arrangement operating in accordance with the present invention. A UE 1, in this case an IPTV UE (set-top box plus display for example) is connected to the network to receive data from the network. The UE 1 is provided with associated storage, such as solid state memory, a hard disk drive or similar, so that data received from the network may be stored locally on the UE 1. This may be integral, or connected locally, by a hard link, wirelessly or otherwise associated with the UE. Whilst only a single UE 1 is shown it should be appreciated that there will generally be a large number of UEs 1 connected to the network, with network resources shared between the UEs 1.

The network is a NGN (next generation network), ie a network designed using IP and QoS (Quality of Service) technology to support all types of customer traffic including but not limited to voice, data and video, which enables a variety of IP-based customer devices and next generation and advanced applications to communicate over a single common network.

The network comprises a network resource allocation means 2, in this case IPTV middleware 29 and RACS (resource and administration control server) 26, a delivery server 3, in this case a CoD server, and BGF (border gateway control function) devices 4. These are shown schematically in FIG. 1.

It will be readily appreciated by the skilled person that alternative network arrangements are possible within the scope of the present invention.

Figure 2:
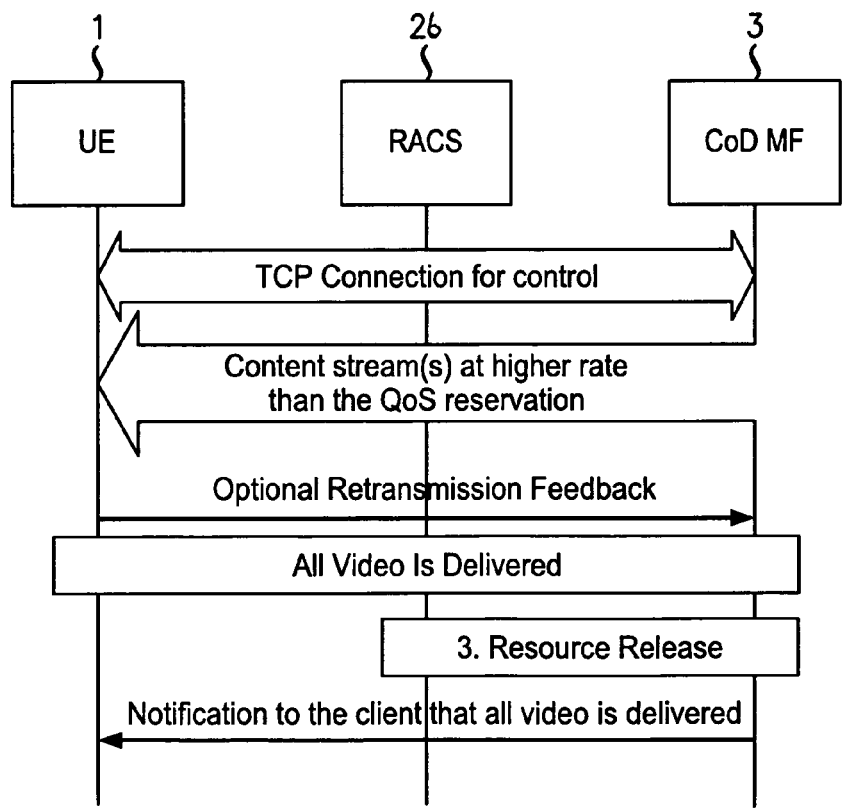
FIG. 2 shows an explanatory diagram of an example resource flow in the network of FIG. 1.
Figure 3:
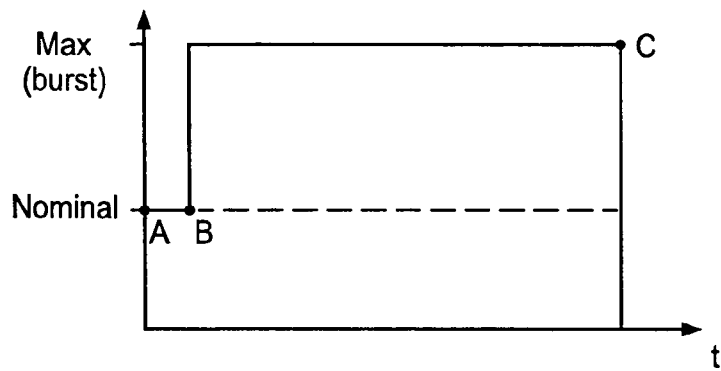
FIG. 3 shows schematically how the delivery rate may vary against time during a network session.

Referring to FIG. 2, there is shown a resource flow on the network of FIG. 1 during a multimedia on demand network session. FIG. 3 shows how the delivery rate may vary with the variation of resources allocated to the network session against time in the present example.

A control connection (network session) is opened between the UE 1 and the CoD server. This is illustrated as point A on the graph of FIG. 3. In this case the delivery mechanism between the UE 1 and the CoD server is TCP (transmission control protocol). However, as discussed later with reference to the examples, the present invention is equally applicable to alternative delivery mechanisms, including, but not limited to UDP (User Datagram Protocol). The control connection is opened by the user requesting a multimedia on demand service at the UE 1. The request is sent to the IPTV middleware, which, in connection with the RACS, reserves network resources (network bandwidth). The network resources are reserved for the duration of the control connection at the nominal service rate (e.g. multimedia encoded bitrate) for the multimedia on demand service requested, for example at 2 Mb/s. The nominal service rate is indicated by a broken line in FIG. 3. With the necessary network resources reserved, and the nominal service rate thereby assured, for the duration of the network session, QoS is assured.

Once the control connection has been opened, the CoD server increases the network resources allocated to the network session above the nominal network resources depending upon the network resources available (point B of FIG. 3). This permits streaming of the content to the UE 1 at a burst delivery rate, which is higher than the nominal rate.

The CoD server uses a 'best effort' approach ('best effort' overlay) to make use of any available (unused) network resources. The CoD server allocates additional resources to the network session independently of the RACS. Thus, whilst the RACS is responsible for reserving and allocating resources at the nominal rate (assuring QoS), it is the CoD server which is responsible for allocating additional network resources, which have not been allocated to, or reserved for, any network session(s) by the RACS. The use of these resources permits delivery at the burst delivery rate. The RACS is unaware of the allocation by the CoD server of the unallocated/unreserved bandwidth, and takes precedence over the CoD server, which means that use of the unallocated/unreserved bandwidth for burst delivery by the CoD server will not have any impact on the QoS of any other network sessions. Should the RACS allocate/reserve the bandwidth being used by the CoD server to provide burst delivery (which it is not aware the CoD server is using) then the additional bandwidth will simply no longer be available to the CoD server. The bandwidth of the network session will not, however, drop below the nominal reserved level.

In the present case, where the delivery method is TCP the burst delivery rate is preferably increased to the maximum speed that the network will allow. However, in alternative arrangements, as discussed below, with reference to the examples that follow and to FIGS. 4 and 5, the burst delivery rate may be increased gradually.

Excess content, delivered above the nominal rate, or even the entire content, is stored locally on the UE 1.

The CoD server delivers content to the UE 1 continuously until all of the content is received by the UE 1. In particular, the content is delivered even whilst the streaming content is paused by a user at the UE 1, or similar, and it is cached at the UE (or at a memory means associated therewith) even while playback is being paused for example.

Since, the content is stored locally on the UE 1, so-called trick play (fast forward, rewind, pause etc) is accommodated by the invention.

Once all of the content has been delivered to the UE 1, the CoD server releases all resources allocated to the network session or instructs the IPTV middleware to release the resources. Point C in FIG. 3 represents resource release. A notification is sent from the CoD server to the UE 1 to notify the user that all content has been delivered. The resources are also released if the user manually terminates the network session at the UE 1. The network resources can be re-allocated, as appropriate, as soon as they are released.

Because the delivery does not pause, even when the end user pauses viewing, the content is continually delivered and cached at the higher than nominal service rate (eg content encoded bit-rate) and the release and re-use of network bandwidth occurs much quicker than with previously proposed schemes.

In an alternative arrangement, the CoD server dynamically varies the resources allocated to the network session above the nominal bandwidth, depending on the available network resources at any time, so that the burst delivery rate is maintained at the maximum that the network will permit at any point in time and the content is delivered to the UE 1 as fast as possible. Such a variation is not shown in FIG. 3, however, it will be readily appreciated that in this alternative the burst delivery rate between points B and C will vary dynamically in accordance with available network resources.

There may be retransmission feedback between the UE 1 and the CoD server, during the burst transmission. This is of particular use when the delivery mechanism is unreliable, for example UDP, and is discussed below with reference to the further examples. In the case of a TCP delivery mechanism there is no need for retransmission feedback, although it may be provided, in which case the burst delivery rate will be reduced if TCP acknowledgement messages are not received within acceptable time limits. Such a feedback may be used with the 'best effort' methodology described above.

The network session uses the QoS session, which lasts for the duration of the content delivery. Since, with burst delivery, the content may be delivered in a period that is shorter than the duration of the content, the multimedia delivery session and the QoS session may effectively be de-coupled. As a result network resources may be released earlier, without affecting the QoS.

Various examples falling within the scope of the invention will now be described.

Instead of a TCP delivery method, as discussed above, a UDP delivery method may be used. In this case a feedback mechanism is provided and rather than increasing the delivery rate to the maximum permitted by the network, as described above, the delivery rate can be increased gradually over the nominal asset encoded bit-rate, waiting for feedback.

Figure 4:
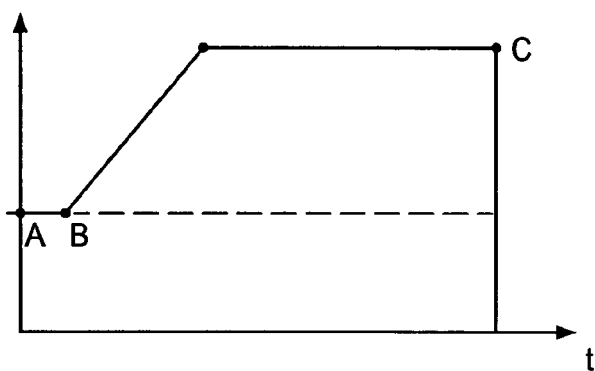
FIG. 4 shows schematically an alternative example of how the delivery rate may vary against time during a network session.

In the absence of feedback the delivery rate may be continually gradually increased. FIG. 4 shows how the delivery rate may vary with the variation of resources allocated to the network session against time in such an arrangement, with the delivery rate continually gradually increasing from point B to the maximum permitted by the network. Whilst the gradual increase is shown as a straight line in FIG. 4 it should be appreciated that the increase may be in gradual steps (as may be seen in FIG. 5), which can be equal or varied.

The delivery rate can also be increased gradually, with the IPTV middleware awaiting feedback periodically or after each increase.

Multimedia data received by the UE 1 at a bandwidth above the encoded/presentation rate, in any arrangement, can be stored on the UE 1, as discussed above.

The network, as defined in any of the arrangements discussed herein, may be provided with a retransmission mechanism wherein, upon the UE detecting missing data at any point, the UE can request missing packets using a retransmission approach and RTP/RTCP (real time protocol/real time control protocol) feedback mechanism, or similar, and either the network or the CoD server will resend missing packets, with feedback available to the CoD server.

Upon receipt of a retransmission request the transmission rate from the CoD server may be decreased until retransmission requests stop. Once the retransmission requests have stopped, the transmission rate may be increased again. The increase and decrease may be cyclic, in dependence on the retransmission requests. Thus, the rate of delivery can be increased up to the limit at which reliable delivery occurs.

Figure 5:
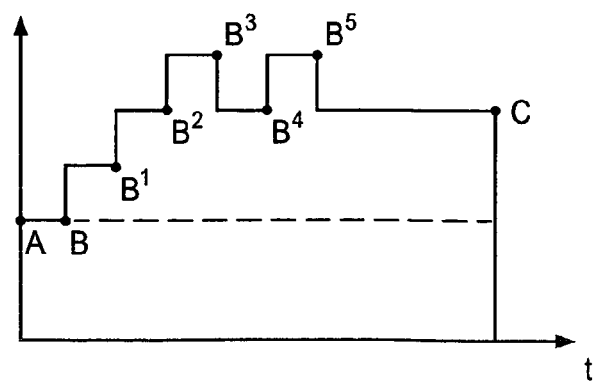
FIG. 5 shows schematically a yet further example of how the delivery rate may vary against time during a network session.
Figure 6:
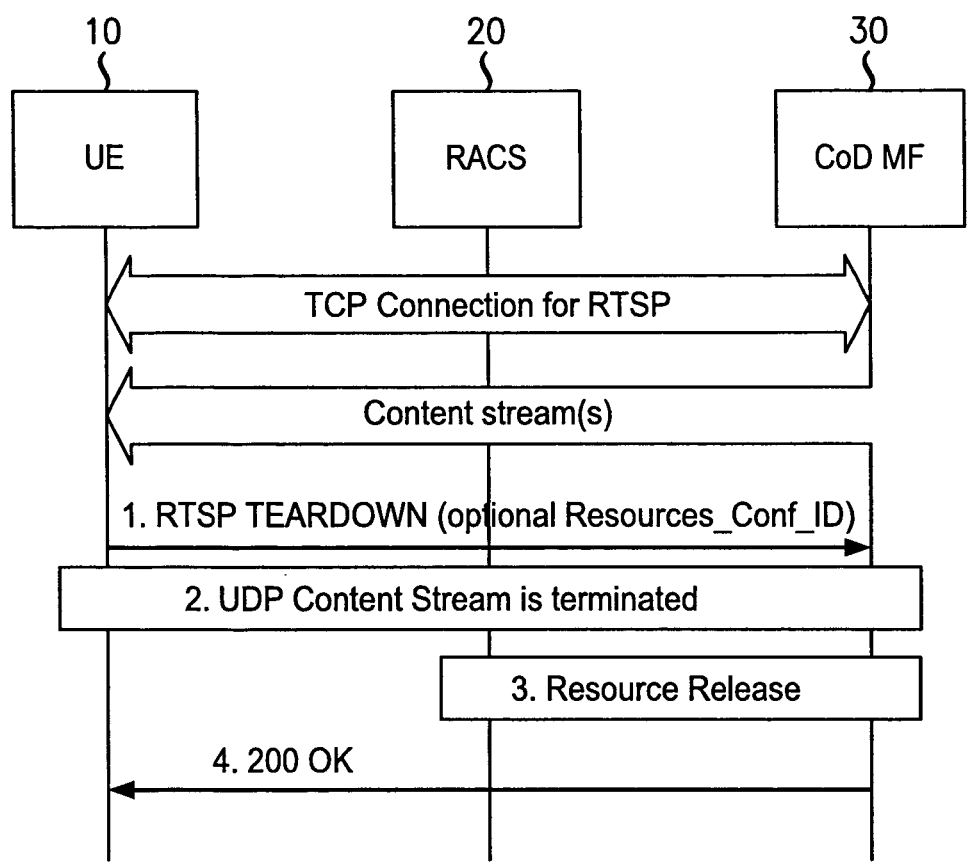
FIG. 6 shows a resource flow in a prior art network.

FIG. 5 shows how the delivery rate may vary against time in an arrangement in which retransmission requests are received. The delivery rate is directly dependent upon the network resources allocated to the network session. The network session is opened at point A and the network resources allocated to the network session are increased above the nominal network resources to a first increased level at point B. At point $B^1$, since no retransmission request is received, the network resources are further increased. A further increase occurs at point $B^2$, since, again, no retransmission request is received. At point $B^3$, following receipt of a retransmission request, the network resources are reduced so that the burst delivery rate is reduced to the previous level at which no retransmission request was received. At point $B^4$, following no retransmission request, the network resources and burst delivery rate are again increased. At point $B^5$, following receipt of a retransmission request, the delivery rate and burst delivery rate are reduced to the previous level at which no retransmission request was received. In the depicted arrangement this resource level is then maintained, which maintains the burst delivery rate at the maximum reliable rate permitted by the connection until all of the content is delivered and the resources are released at point C. In alternative arrangements more or less attempts to increase the bandwidth following retransmission requests may be made. Furthermore, although the steps are depicted as being equal it should be appreciated that this need not be the case, since the increase of bandwidth at each step may vary and/or the time between an increase and a subsequent retransmission request may vary. The first increase may be to the maximum rate permitted by the network, with subsequent decreases until an appropriate maximum delivery rate, in accordance with the connection, is determined.

Preferred embodiments of the present invention allow for the release of a network QoS session earlier during the service, without degrading user experience because playback pausing or other factors do not cause pausing of delivery, wherein the released network resources can be used for other services. The invention may also optimise network usage, which leads to an increase in network capacity, particularly to the capacity of the core networks where bottlenecks often occur; and decouples the duration of service session from the underlined QoS network session. It is applicable to IPTV and OTTP services; and allows QoS for OTTP services while preserving the bursting nature of download traffic, saturating available bandwidth.

Whilst preferred embodiments of the present invention have been described in terms of on-demand multimedia delivery, namely on-demand IPTV, it should be noted that the present invention is applicable to any services requiring QoS, including but not limited to gaming and content sharing.

The invention claimed is:

1. A multimedia delivery network, comprising:
a network resource allocator that is configured for allocating bandwidth to a network session between an associated user equipment (UE) device on the network and a delivery server,
wherein the network resource allocator is configured to reserve a nominal bandwidth for the network session when the session is opened, which permits delivery of data from the delivery server to the UE at a nominal service rate at which QoS is assured, and
wherein the delivery server is configured to increase the bandwidth of the session, to a higher bandwidth once the session has been opened, to permit delivery of data from the delivery server to the UE at a burst delivery rate higher than the nominal rate, wherein the delivery server is configured to use a best effort overlay to dynamically vary the bandwidth allocated to the network session above the reserved nominal bandwidth, depending on the available network bandwidth to provide a burst delivery rate that varies depending upon the available network bandwidth at any time during the network session.

2. The network of claim 1, wherein the UE is provided with a data storage device for storing data received from the delivery server, such that data delivery can continue while data is being stored.

3. The network of claim 1, wherein the UE is IPTV equipment.

4. The network of claim 1, wherein the delivery server is configured to increase the bandwidth to the maximum bandwidth available, so as to provide a burst delivery rate which is as high as the network will permit.

5. The network of claim 1, wherein the delivery server is configured to increase the bandwidth gradually.

6. The network of claim 5, wherein the UE is configured to provide feedback to the delivery server.

7. The network of claim 6, wherein the delivery server is configured to increase the bandwidth gradually, and to receive feedback indicating the state of the content received by the UE, so as to limit the burst delivery rate to a speed appropriate to the connection between the delivery server and the UE.

8. The network of claim 1, wherein the UE is configured to detect missing data and to request missing packets from the delivery server or network using a retransmission feedback mechanism.

9. The network of claim 8, wherein the delivery server is configured to increase the bandwidth gradually until a retransmission request is received, and, once the retransmission request has been received, to reduce the bandwidth until retransmission requests are no longer received.

10. The network of claim 9, wherein the delivery server is configured to periodically increase and decrease the bandwidth, in accordance with the retransmission requests.

11. A content delivery method over a network, the method comprising: modifying network bandwidth allocated to a network session between a user equipment (UE) device on a network and a delivery server, wherein a nominal bandwidth for the network session is reserved when the session is opened, which permits delivery of data from the delivery server to the UE at a nominal service rate at which QoS is assured, and the bandwidth of the session is increased, to a higher bandwidth once the session has been opened to permit delivery of data from the delivery server to the UE at a burst delivery rate higher than the nominal rate, wherein the delivery server dynamically varies the bandwidth allocated to the network session above the reserved nominal bandwidth using a best effort overlay and depending on the available network bandwidth to provide a burst delivery rate that varies depending upon the available network bandwidth at any time during the network session.

12. The method of claim 11, wherein the delivery server increases the bandwidth to the maximum bandwidth available, so as to provide a burst delivery rate which is as high as the network will permit.

13. The method of claim 11, wherein the delivery server increases the bandwidth gradually, wherein feedback is received by the delivery server from the UE indicating the state of the content when delivered, so as to limit the burst delivery rate to a speed appropriate to the connection between the delivery server and the UE.

14. The method of claim 11, wherein the delivery is maintained even while playback or receiving of content is paused or interrupted.

15. A delivery server, comprising:
at least one hardware-based processor configured to increase a bandwidth of a network session between an associated user equipment (UE) device on a network for which a nominal bandwidth is previously reserved, to permit delivery of data from the delivery server to the UE at a nominal service rate at which QoS is assured, to a higher bandwidth greater than the nominal bandwidth, once the session has been opened, using a best effort overlay to permit delivery of data from the delivery server to the UE device at a burst delivery rate higher than the reserved nominal rate; and
to dynamically vary the bandwidth allocated to the network session above the reserved nominal bandwidth, depending on an available amount of network bandwidth to provide a burst delivery rate that varies depending upon the available network bandwidth at any time during the network session.

16. The delivery server of claim 15, wherein the at least one processor is configured to:
receive feedback information from the associated UE device, the feedback information indicating a state of the data received by the associated UE device; and to
limit the burst delivery rate, based on the feedback information, to a rate appropriate to a connection between the delivery server and the associated UE device.

17. The delivery server of claim 15, wherein the at least one processor is configured to: increase the bandwidth in increments until a retransmission request is received and, once the retransmission request has been received, to reduce the bandwidth in increments until retransmission requests are no longer received.

18. The delivery server of claim 17, wherein the at least one processor is configured to periodically increase and decrease the bandwidth, in accordance with a respective absence or reception of retransmission requests.

* * * * *